UNITED STATES PATENT OFFICE.

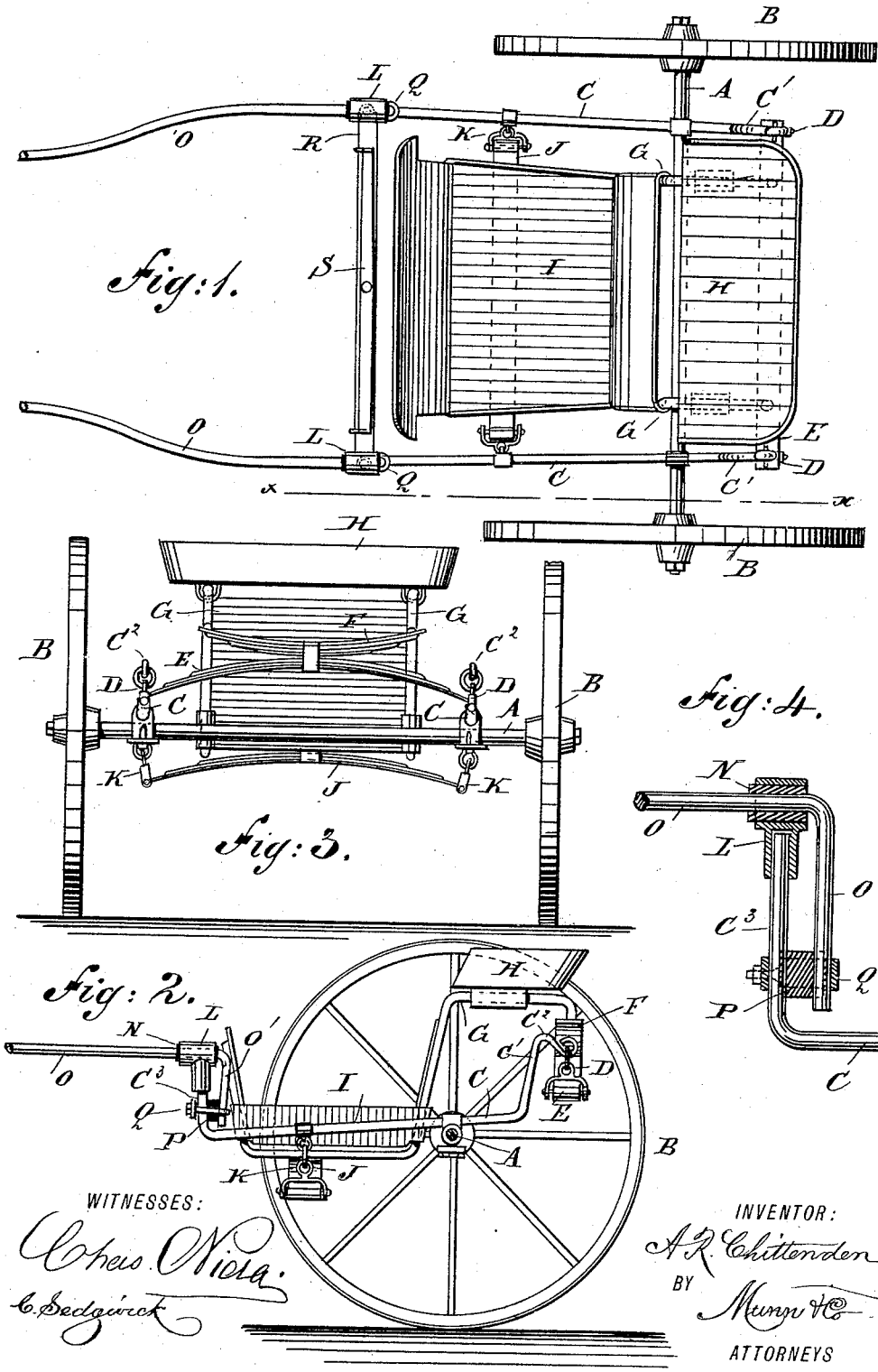

ANNIE R. CHITTENDEN, OF OSCEOLA, IOWA.

ROAD-CART.

SPECIFICATION forming part of Letters Patent No. 463,096, dated November 10, 1891.

Application filed December 29, 1890. Serial No. 376,146. (No model.)

*To all whom it may concern:*

Be it known that I, ANNIE R. CHITTENDEN, of Osceola, in the county of Clarke and State of Iowa, have invented a new and Improved Road-Cart, of which the following is a full, clear, and exact description.

The invention relates to two-wheeled vehicles, and its object is to provide a new and improved road or dog cart which is simple and durable in construction, supports the weight of the occupants on the axle, so as to relieve the animal of all strain, at the same time obviating the disagreeable jar frequently found in carts as now constructed.

The invention consists in certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line $xx$ of Fig. 1. Fig. 3 is an end view, and Fig. 4 is an enlarged sectional side elevation, of the connection of the shafts with one of the bars.

The improved two-wheeled vehicle is provided with an axle A, on the ends of which are mounted to turn the wheels B. On the axle A are secured two longitudinally-extending bars C, each projecting a short distance to the rear of the axle A, and then extending upward to form an arm C', on the upper end of which is formed a rearwardly and downwardly extending hook $C^2$, in which is hung a link connection D, consisting of a clevis and ring, and supporting the end of an elliptical spring E, extending between the two bars C.

The elliptical spring E is bent upward and supports in its middle a second elliptical spring F, the ends of which are rigidly connected with the ends of bars G, supporting the seat H, and bent downward in front of the axle A to extend forward to support the foot-box I. On the under side of the foot-box I is secured by suitable means an elliptical spring J, which extends transversely to the side bars C, each end of which is connected with the latter by the link connection K, similar in construction to the connection D.

The link connections D and K connect the two springs E and J with the bars C, and are arranged so as to have transverse movement to permit sidewise swinging of the seat and the foot-box I. The front ends of the bars C are bent upward to form the part $C^3$, (see Figs. 2 and 4,) on the upper ends of which are secured sockets L, each of which supports a longitudinally-extending rubber sleeve N, through which sleeves pass the shafts O. Each of the shafts O is provided at its rear end with a downwardly-extending arm O', resting against the rubber block P, held between the arm O' and the part $C^3$ of the respective bars C. A clip Q passes over the sides of the rubber block, around the rear part of the arm O', to be fastened to the parts $C^3$, so that a flexible connection is established between the shafts O and the bars C. Instead of the flexible connection the shaft O may be rigidly fastened to the bars C. The upwardly-extending parts $C^3$ of the two bars C are rigidly connected with each other by a cross-piece R, on which is fulcrumed the single-tree S, to which the animal is hitched in the usual manner.

It will be seen that the seat H can be made sufficiently large to conveniently accommodate two persons, and that the weight of the load is thrown directly on the axle A, so that the animal is relieved of all the strain. As the shafts O are flexibly connected with the bars C, supporting the seat and the foot-box I, all jar incident to the animal's motion is taken up by the flexible connection, so that the occupants of the cart are not affected by the jarring motion. At the same time the animal is not injured by the shafts in case one of the wheels B strikes an obstruction in the roadway, owing to the said flexible connection between the shafts O and the bars C.

The connection between the seat H, the foot-box I, and the bars C permits the former to swing in any direction, thus insuring an easy riding in the vehicles.

The cart can be constructed to carry one or two persons, the several parts being constructed lighter or heavier, as the case may be.

Having thus fully described my invention,

I claim as new and desire to secure by Letters Patent—

1. In a road-cart, the combination, with the axle and a seat and foot-box support, of bars secured to the axle and having their rear ends bent upwardly and outwardly, a spring secured to the rear part of the seat and foot-box support and connected to the ends of the said bars by link connections, a spring secured to the foot-box and having its end connected to the said bars by link connections, and shafts secured to the forward ends of said bars, substantially as described.

2. In a road-cart, the combination, with the axle and a seat and foot-box support, of bars secured to the axle and having upwardly-bent rear and forward ends, a spring secured to the rear part of the seat and foot-box support and connected to the upwardly-projecting rear ends of the bars by link connections, a spring secured to the foot-box, having its ends connected to the bars by link connections, and shafts flexibly secured to the upwardly-projecting forward ends of the bars, substantially as described.

3. In a road-cart, the combination, with the axle, and a seat and foot-box support, of bars secured to the axle and having upwardly-bent forward and rear ends, a spring secured to the seat-support, a second spring secured to the first-named spring and having its ends connected to the upwardly-projecting rear ends of the bars by link connections, a spring secured to the foot-box and connected to the said bars by link connections, and shafts secured to the upwardly-projecting forward ends of the bars, substantially as herein shown and described.

4. In a road-cart, the combination, with the longitudinally-extending bars secured to the axle and each provided with an upwardly-extending arm, of a socket held on the upper end of each upwardly-extending arm, a rubber sleeve secured in each of the said sockets, shafts passing through the said rubber sleeves, each provided with a downwardly-extending arm held to the respective upwardly-extending bar-arm, and a rubber block interposed between said arms, substantially as shown and described.

ANNIE R. CHITTENDEN.

Witnesses:
H. F. SIMMONS,
C. A. TWYFOOD.